Figure 1:
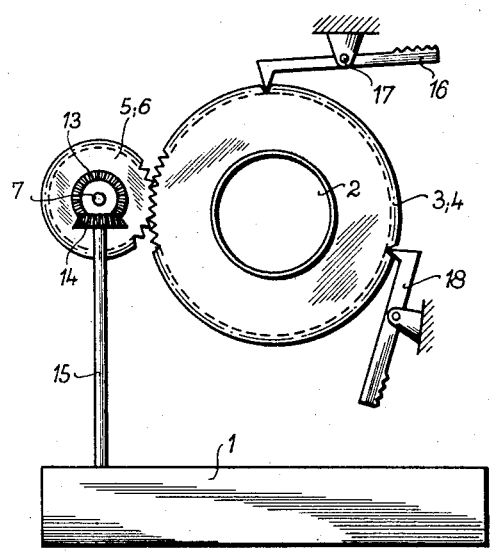

Nov. 24, 1959     F. FAULHABER     2,913,969
PHOTOGRAPHIC CAMERA WITH AUTOMATIC ADJUSTMENT
OF THE EXPOSURE CONDITIONS
Filed July 18, 1956     7 Sheets-Sheet 1

Nov. 24, 1959  F. FAULHABER  2,913,969
PHOTOGRAPHIC CAMERA WITH AUTOMATIC ADJUSTMENT
OF THE EXPOSURE CONDITIONS
Filed July 18, 1956  7 Sheets-Sheet 7

United States Patent Office 2,913,969
Patented Nov. 24, 1959

2,913,969
PHOTOGRAPHIC CAMERA WITH AUTOMATIC ADJUSTMENT OF THE EXPOSURE CONDITIONS

Fritz Faulhaber, Schonaich, Bezirk Boblingen, Germany, assignor to Voigtlander, A.G., Braunschweig, Germany, a corporation of Germany Application July 18, 1956, Serial No. 598,547

Claims priority, application Germany July 30, 1955

9 Claims. (Cl. 95—10)

The present invention relates to photographic cameras provided with means for automatically adjusting exposure conditions, said means being controlled by the electric current of a photo-cell. It has particular relation to devices of this type, in which one or more exposure factors (e.g. time or diaphragm or film sensitivity and the like) are preliminarily adjusted by hand, whereupon one of the exposure factors (time or diaphragm) is adjusted by the automatic system so that the light value necessary for correct exposure, is brought about.

In some of the known devices of this type, the photo-current of the photo-cell is conducted to an indicating device. The pointer of this indicating device is first arrested and then scanned, whereby the position of the pointer determines the adjustment of the elements scanning the pointer. In these known devices, transmission to the diaphragm adjustment was effected by a gear, in which other values could be likewise adjusted. According to experience, scanning of the pointer has often an adverse effect on the usually rather sensitive measuring instruments. Moreover, the automatic systems hitherto known are mechanically very complicated. Due to these disadvantages, these known cameras could not stay on the market. The necessary photographic requirements have also not been sufficiently considered in the construction of the above mentioned known devices.

The automatic diaphragm-adjusting system according to the present invention needs a somewhat more detailed explanation than other devices or arrangements used in photographic devices. The reason is that the automatic adjustment of the diaphragm according to the present invention has novel mechanical, as well as photographic and electrical features. Accordingly, the following description of the present invention is divided into separate sections dealing with the above mentioned three kinds of features.

(1) *The photographic requirements*

The conventional method of measuring illumination or light by means of exposure meters has the disadvantage that it grasps a much too large image angle which often does not correspond to the integral over the amount of light, and the illumination of the object. This, however, is established by the requirement of a strong adjusting current for the indicating device. In view of this, it is necessary to apply in conventional exposure meters corrections which correspond to the relation between illumination of the object and the illumination of the surroundings and require experience in the use of such devices. This disadvantage would not occur in operation with very small "image" angles, but the conventional exposure meters would not be capable of measuring such small light intensities. From these facts, it is concluded according to the present invention that the image angle picked up by the automatic diaphragm-adjusting system should be very small and preferably include dimensions which are smaller than a photographic object of medium size.

It is contemplated according to the present invention to select for the light-incidence angle of the control organ (photo-cell) of the automatic diaphragm adjusting system, about 1/10 to 1/15 of the solid angle of the picture-taking objective.

It is conventional practice of motion-picture operators to illuminate objects at a very sharp angle.

A further requirement is that the system of the automatic diaphragm adjustment should be sufficiently sensitive, so that it is capable of correct adjustment of the diaphragm also in interior photography, without the use of additional artificial light.

The range of brightness, in which an automatic adjustment of the diaphragm or time should safely operate extends from about 100,000 Lux to 10 Lux. Small illumination intensities which are near to this lower limit cannot be measured with a conventional commercial exposure meter, although the latter has a relatively large image angle so that more lumina reach the photo-cell.

Therefore, the present invention contemplates not only amplification of the photo-cell current, but substitution of the hitherto customary solid photovoltaic cell by a resistance photo-cell with lead sulfide or cadmium sulfide. The conclusions from this are discussed further below, in the section relating to the electrical requirements of the automatic diaphragm adjustment.

In connection with the photographic requirements, it is also necessary that the system should automatically correct wrong adjustments by the operator. If, for example, a too long exposure time is selected in the use of a highly sensitive film at a relatively strong illumination of the object, then the automatic diaphragm adjustment should—after reaching the lowest diaphragm limit—automatically change also the time, so that a correct exposure of the film in lumen $x$ seconds, results.

The appended drawings illustrate by way of example some embodiments and the best way of carrying out the invention, and include further details of the invention. Equal parts are denoted by equal reference numerals.

Figure 2:
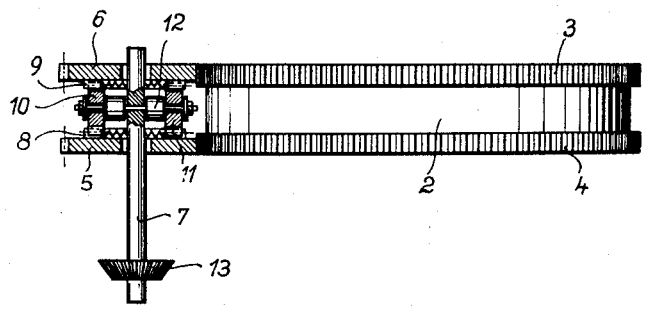
Figure 3:
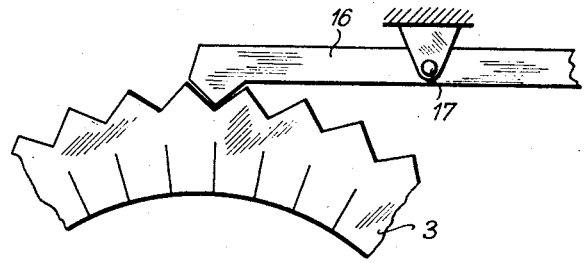
Figure 4:
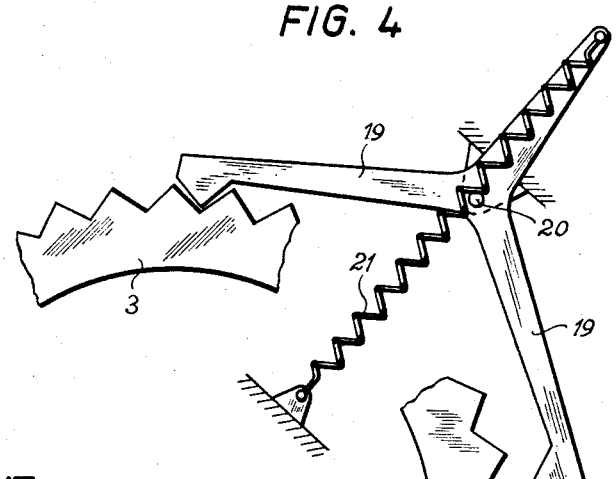
Figure 5:
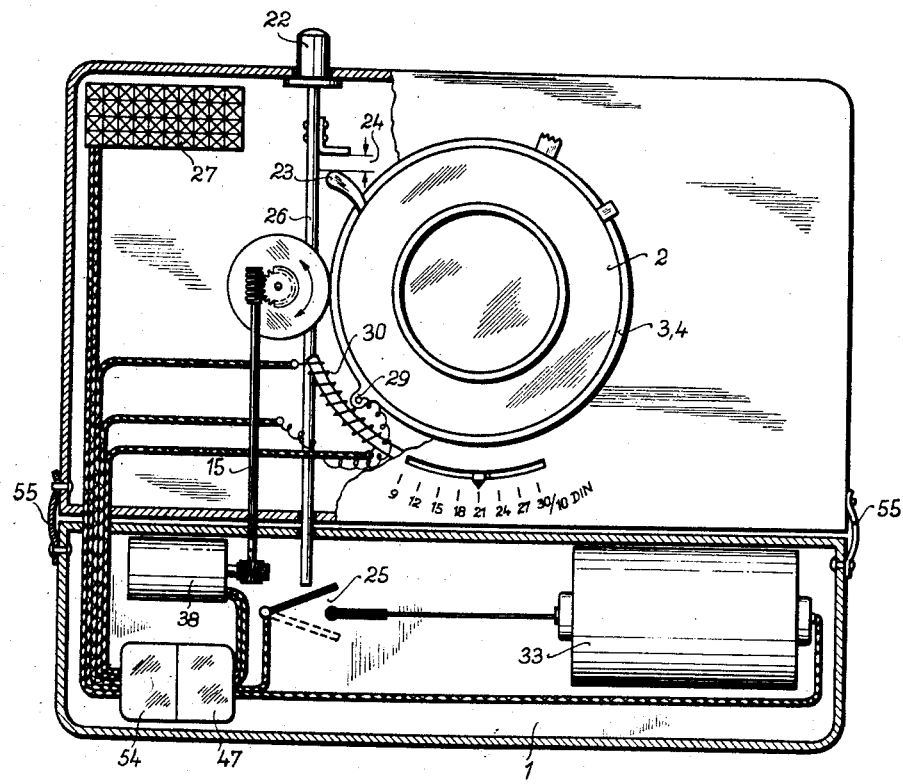
Figure 6:
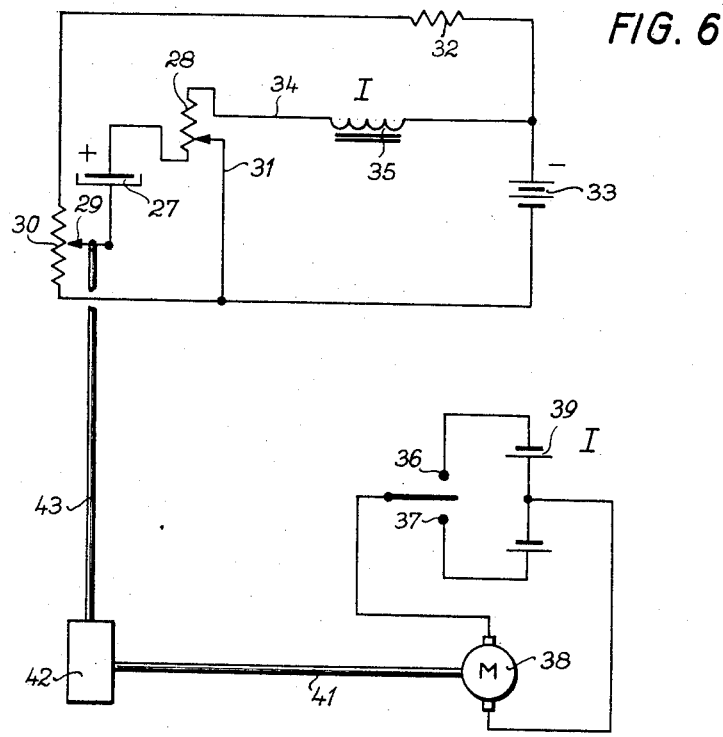
Figure 7:
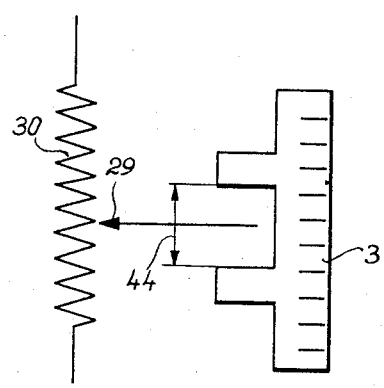
Figure 8:
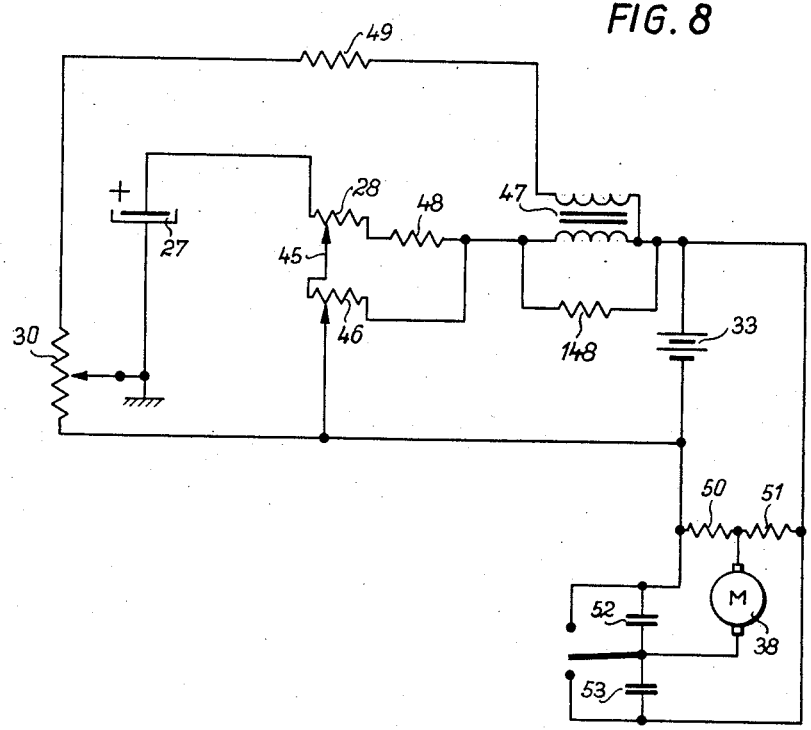
Figure 9:
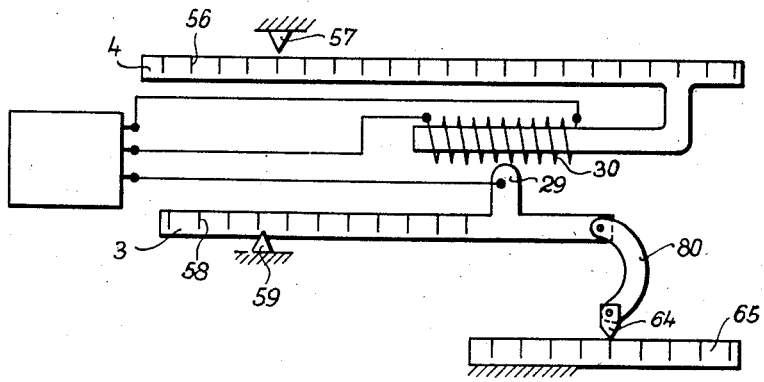

In the drawings:

Figs. 1 and 2 diagrammatically illustrate a differential gear between the automatic diaphragm adjustment and the shutter, while Figs. 3 and 4 illustrate details and modifications of the construction shown in Figs. 1 and 2; Fig. 5 illustrates an arrangement of the means for switching on the automatic system and the shutter; Fig. 6 and Fig. 7 diagrammatically illustrate the arrangement and operation of the photo-cell, while Fig. 8 shows a specific wiring arrangement; Fig. 9 illustrates the mutual relation of certain parts, while the operation of all parts is illustrated in Figs. 10–17.

In the arrangement shown in Fig. 1, between the mechanism of the automatic diaphragm adjustment 1 and the shutter 2 provided with diaphragm- and time-rings 3 and 4 (each of which has a toothing on its outer periphery) a differential gear is diagrammatically shown. The latter consists of cog wheels 5 and 6, which are in engagement with rings 3 and 4 (see Figs. 1 and 2) and are loosely seated on the shaft 7. These two cog wheels have on their inner face toothings 8 and 9, which mesh with pinions 10 and 11. These pinions are rendered rotatable about shaft 7 by means of a shaft 12 fixedly connected with shaft 7. Depending on whether diaphragm ring 3 or time ring 4 is arrested, wheels 10 and 11, when driven over shaft 7, will roll on face gear 9 or face gear 8 and will drive the counter wheel with double velocity. Shaft 7 is driven, over a bevel wheel 13, by a second bevel wheel 14. This second bevel wheel 14 is rotated by shaft 15 which extends from the automatic diaphragm adjusting means 1. By this arrangement the following functions are made possible:

The diaphragm can be adjusted to a predetermined value and arrested over a stop lever 16, which is pivoted at 17 (see Fig. 1). Subsequently, by the automatic diaphragm adjustment, the time is adjusted in dependence on the illumination. If, however, by means of a second lever 18 the time ring is fixedly adjusted to a time value, then the diaphragm will also adjust until the correct exposure condition is attained. Thus, either the diaphragm, or the time, can be freely preselected. The levers 16 and 18 are stop levers and not locking levers (see Fig. 3), i.e., these levers stop the respective time or diaphragm ring only with a certain moment of rotation and they nevertheless permit to carry out operations by hand, whereby the points of the teeth in 3 and 4 (see Figs. 3 and 4) pass over the points of levers 16 and 18. As always one value (i.e., diaphragm or time) is preselected, it is preferred to combine levers 16 and 18 to a single lever, as shown in Fig. 4.

In Fig. 4 the time ring is denoted 4 and the diaphragm ring (which is located in another plane than the time ring) is denoted 3. Lever 19 which is a combination of levers 16 and 18 has two detent heads and has a stationary pivot at 20. A spring 21 is arranged in such a manner that it holds the lever in one or the other end position. The rings 3 for the diaphragm and 4 for the time, have rather definite adjusting angles. If the ends of these angle paths are reached, these rings 3 and 4 abut at end stops. These end stops may comprise any conventional expedient such as the termination of the row of teeth to effect binding of the gears. In the case of a normal Compur-shutter, size 00, this will occur for time when on one side 1 second and on the other $\frac{1}{500}$ second is reached. In the case of the diaphragm, the stops will be reached when, on the one hand, the largest diaphragm, e.g., 2, and, on the other hand, the smallest diaphragm, e.g., 22 is reached. The arrested ring (either 3 or 4) will be moved subsequently by the automatic diaphragm adjustment, if the adjustment of the free ring is not sufficient.

In view of the photographic requirements, it is, furthermore, necessary that the measurement should take place in the course of the usual operation of the camera, without the necessity of additional operating steps. This means that operation of the automatic system should take place during taking a picture in such a manner that adjustment of the diaphragm or time takes place when other steps which precede the taking of a picture, are carried out by the user of the camera.

As such steps are carried out prior to the taking of a picture, after correct adjustment of the diaphragm, only the setting of the correct distance has to be carried out. Therefore, according to the present invention, switching on of the automatic system by the release button is effected in such a manner that said button can be actuated in two steps. The first step, which requires relatively little force and the end of which is indicated by a distinct pressure point, brings about switching on of the automatic system. The finger of the person operating the camera remains in this position until the distance, which is checked by the built in range-finder, is correctly adjusted.

Figure 5 illustrates arrangement of the means for switching on the automatic system and of the shutter. The release button 22 operates on one hand the shutter 2 with its release member 23, whereby a free path 24 must be covered until release takes place. The button also operates switch 25 of the electric circuit of the automatic diaphragm adjustment, arranged in the lower part 1. The free path 24 is selected in such a manner that closing of the switch 25 takes place first. After the release button 22 covers a certain path, switch 25 opens and release member 23 is operated. The additional operation of release member 23 is marked by a pressure point which can be distinctly felt in pressing down the release button 22.

(2) *Electrical requirements*

Prior to a detailed explanation of the mechanical construction, the relationship between the photo-cell and the driving source for the automatic adjustment of time and diaphragm rings will be described. The driving source for the automatic system consists, for example, of a small direct current electro-motor which has a permanent field and can be driven by a battery which is built in the lower part of the arrangement. The building in of such a motor and of a battery for other operating steps in photographic cameras has been known. According to the present invention, the battery is used for driving the motor for the automatic adjustment of time and diaphragm rings and for operating the necessary amplifier.

The following description relates to a solid photovoltaic cell of the type used in conventional exposure meters. Substitution by a resistance cell does not cause essential changes.

In Figure 6, 27 denotes the photo-cell, the positive end of which is connected to the base of a transistor 28. The negative end of the photo-cell is connected to the sliding contact 29 of the potentiometer 30, one end of which is connected to the emitter 31 of the transistor and the other end is connected, over a resistance 32, to the source 33 of electromotive force, the second end of which is likewise connected to the emitter 31. The collector 34 passes over a relay 35 to the negative terminal of current source 33.

This basic circuit operates as follows:

It is assumed that the photo-cell is exposed to light so that as the result of its electromotive force, in the circuit formed by the photo-cell—transistor base—emitter—lower end of the potentiometer—sliding contact—and back to the photo-cell—an electric current is produced. This current has the effect that in the collector-circuit formed by the collector 34, relay 35, battery 33 and emitter 31, there will be a relatively much stronger electric current than the current in the emitter circuit. In conventional transistors, the current amplification factor amounts to about 30. This means that if the current flowing in the emitter circuit amounts to 0.03 milliampere, then a current of 1 milliampere will flow in the collector circuit. The relay 35 has two contacts 36 and 37. One of these contacts is always closed. Furthermore, the relay 35 has a rather definite operating current and a definite current at which release occurs. These two currents are somewhat different. However, in the case of the basic circuit diagram it has been assumed that the operating current and the release current are equal. As mentioned above, upon exposing to light the photo-cell 27, a stronger electric current will be produced in the collector circuit of the transistor. If this current is of about 1 milliampere, then the relay will attract. Attraction of the relay will have the effect that the motor 38, which is driven by the current source 39, will change its original direction of rotation and then—driven by current source 40—will move the sliding contact 29 of the potentiometer to the other side. The motor moves, over a shaft 41, a gear 42, and a shaft 43, the sliding contact of the potentiometer in such a manner that the change of current brought about by the exposure to light is compensated for by the voltage tapped at the potentiometer, i.e., the arrangement is a voltage compensating circuit. The details of the gear between motor 38 and the potentiometer 30 are described here further below in the section relating to the mechanical requirements.

Assuming that a stronger exposure to light brings about a larger electromotive force in the photo-cell, then the motor will move the sliding contact upward in the direction of resistance 32, because in this case a larger opposite electromotive force is automatically tapped for compensation. Thereby, it is of advantage to always avoid complete reduction of the emitter current up to 0, because otherwise the working point of the relay cannot be adhered to. In the above example, it has been assumed that the working point of the relay is at 1 milliampere. This current of 1 milliampere will be thus always preserved after each compensation. Reversal of the relay will now occur because the sliding contact is displaced by the motor. This has the effect that the motor runs in the other direction and the sliding contact will start now again to move in the other direction. After a while, by under-compensation, the point at which the relay attracts will be reached again. This play goes on to and fro until the current is interrupted by the switch 25 (see Figure 5) upon further pressing down the release button 22. It should be pointed out here that in spite of the inertia of the relay, the diaphragm is operated in such a manner that it is adjusted to the correct value, while—owing to its inertia—the relay always switches too early or too late. This takes place according to the present invention as follows.

The relay has a predetermined initial current intensity of, for example, 1.2 milliamperes. However, at sinking current, the relay will not release until the current is reduced to 0.8 milliampere. This difference would cause a defective adjustment by 1 or 2 diaphragm values, unless a lost motion 44 is inserted between the sliding contact 29 of the potentiometer and the diaphragm scale 3 to be operated by this sliding member. It will be understood from the above description of the operation of the basic circuit diagram that the motor and thus also the sliding contact of the potentiometer carry out a pendulum movement (due to the reversal of the relay), the amount of which is dependent on the inertia of the relay. In the above example, the reversal of the relay will always occur when the current differs by ±0.2 milliampere from its mean value. This difference of ±0.2 milliampere in the relay circuit is brought about by a very definite movement of the sliding contact of the potentiometer. If the lost motion 44 (see Fig. 7) is equal to the displacement which the potentiometer-slider 29 needs for the ±0.2 milliampere (which represents the inertia of the relay), then the diaphragm—after it has once taken a fixed position—will not further move, although the slider of the potentiometer may move to and fro, driven by the motor.

If illumination of the photo-cell changes, even by a small amount only, the diaphragm scale 3 will be immediately displaced in the corresponding direction, even if only small fractions of a diaphragm interval are concerned. The mechanical details of this arrangement are described further below in the section relating to the mechanical requirements.

The basic circuit diagram shown in Fig. 6 has unfortunately the disadvantage that, in the form shown, it does not sufficiently satisfy all necessary requirements of the device, because amplification of the current in a transistor is by far not sufficient to effect adjustment to low light intensities.

Fig. 8 illustrates the preferred circuit arrangement. In this figure, 27 denotes the photo-cell, the plus end of which is connected to the transistor 28. The emitter of this transistor is connected to base 45 of a second transistor 46, the emitter of which is connected to the common circuit which connects the potentiometer 30 and the battery 33. Such a connection in series of two transistors represents a direct current amplifier. The collectors of both are jointly conducted to a spool of the relay 47. The other end of the relay 47 is connected to a battery 33. In order to avoid overstraining of the first transistor 28, a resistance 48 of about 0.1 MO is inserted in the collector circuit. The other end of the potentiometer 30 is connected over a resistance 49 to a second winding of the relay 47. Both windings are applied to the same core and operate the switch tongue. The functioning of this circuit arrangement in comparison with the arrangement shown in Fig. 6 is more advantageous, with the exception of the amplification of the photo-cell current by the transistors. The spool of the relay which is in the collector current circuit and the spool which is in the current circuit of the potentiometer are oppositely connected. Thus, there will flow through one spool of the relay of certain electric current which attempts to cause release of the relay and there will flow an electric current through the other spool which has the effect of attracting the relay. This precaution serves for compensation of fluctuations which may occur in the voltage of the battery. In order to explain this, reference is first made to the electromotive force produced in the operation of the instrument, i.e., the electromotive force derived from the photo-cell. This electromotive force of the photo-cell is entirely independent from temperature and time, i.e., the photo-cell has to be considered as a constant member of the arrangement so that definite intensities of the light (to which the photo-cell is exposed) correspond to likewise definite voltages and currents supplied by the photo-cell. These exactly defined voltages and currents are balanced by a counter-voltage at the potentiometer 30, with the exception of the residual current, which serves to reverse the relay. If the voltage of the battery 33 sinks considerably, then according to the diagram in Fig. 6 the sliding contact would have to tap a considerably greater voltage drop at the potentiometer, in order to balance again a definite electromotive force of the photo-cell. This would mean that diaphragm values adjusted in the use of an old battery would be always different from those in the use of new batteries. In the wiring shown in Fig. 8, the decrease of the battery voltage is compensated in the following manner: the current of the potentiometer which passes through the upper winding of the relay, also decreases when the battery voltage decreases, so that now, i.e., in the case of an old battery, the relay starts more easily. The conditions are adjusted in such a manner that in the case of an old battery, the electromotive force tapped by the slider is not the same as in the case of a new battery, in spite of the fact that the slider is in the proper measuring position, but the weaker electromotive force in the starting circuit produces a weaker current in the lower spool, which is sufficient for the reversal of the relay. The compensation of fluctuations of the battery voltage by means of supplementary windings in a manner similar to that used in low-voltage techniques has been known by itself. In using such wiring, it is contemplated according to the present invention to use for the compensation a current which flows through the potentiometer.

Now, the functioning of an automatic diaphragm adjustment is dependent not only on the battery voltage, but also on the temperature. The transistors have a considerable temperature coefficient, as the result of which they supply upon warming a stronger current than upon cooling. In order to balance this inadvertent influence of temperature, in a position parallel to the lower winding of the relay, a resistance 148 is inserted which has a negative temperature coefficient. Various forms of such resistances are commercially available.

In using the above described compensating means, the amplifier can be used with old batteries as well as new batteries and independently from the changes of atmospheric temperature.

The drive of the motor over the relay takes place in such a manner that an artificial central point, at which one end of the motor 38 lies, is created over the battery 33 by means of resistances 50 and 51. The other end of the motor 38 is connected to the contact tongue of the contact set of the relay 47, while the contacts lead to the battery and the resistances 50, 51. Depending on whether the contact tongue of the relay is in contact with one or the other contact member, the motor will run in one or the other direction and will thereby take along the sliding contact of the potentiometer 30.

The starting and stopping of the motor 38 and the corresponding protection for the contacts of the relay is assured by the condensers 52 and 53, or similar means.

The potentiometer 30 has—under the selected conditions in view of the input resistance of the transistors and transfer resistance of the contacts—an order of magnitude between 1000 and 5000 ohms. In view of the fact that a voltage compensation wiring of the photo-cell has been selected, the contact resistance between the slider and the potentiometer path is of no importance. The resistances behind the sliding contact, which consist of the photo-cell and the two input resistances of the transistors, exceed by many orders of magnitude the transfer resistance expected at the slider or sliding contact. As an example it is mentioned that the resistance of the photo-cell (not exposed to light) can amount up to 0.1 MO while the input resistances of the transistors amount together to about 2000 ohms. In view of this, a transfer resistance of the sliding contact, which amounts to a few ohms, is not important. The selected voltage of the driving battery amounts to 22½ volts, because such a battery is easily available in all countries and, moreover, it permits the insertion of a flash light device in the camera.

Other obvious electrical steps, such as for example connection of suitable parts of the wiring with the metallic mass of the device, are conventional in wiring arrangements and therefore not particularly mentioned herein. However, it will be understood from Figs. 15, 12 and 8 that the sliding contact of the potentiometer and one side of the photo-cell are grounded.

The above mentioned steps also include compensation for temperature of the transistor amplifier, which is effected in the present wiring by means of the resistance 148. This compensation for temperature can be effected also at another point within the transistor amplifier.

(3) Mechanical requirements of the automatic diaphragm adjustment

The mechanical arrangement of the individual parts, such as amplifier, motor, relay and battery, is diagrammatically illustrated in Fig. 5. In the latter, reference numeral 1 denotes a lower part applied to the camera, said lower part housing the battery 33, the motor 38, the amplifier 54 and the relay 47. In addition to these parts, the contact 25 and the parts necessary for holding the structural elements are present in said lower part 1. The photo-cell 27, the potentiometer 30 and its sliding contact 29 are arranged in the upper part of the camera. The release rod 26 extends from the camera into said lower part 1 in order to operate there contact 25, which—after the lost motion path 24 has been covered—is in the position shown in dotted line, i.e., is switched off again. Only then is the release member 23 operated. Said lower part 1, which contains the above mentioned structural elements, is fastened by means of the fastening flap 55, to the camera. It may be mentioned that said lower part may also contain the thread for the tripod and, if desired, also means used in operating the camera, such as back winding button and unlocking button, it being understood that these parts do not form part of the present invention, which can be adapted to all kinds of cameras.

Fig. 9 illustrates the time scale 56 on the time ring 4, said scale being represented as rolled out and adjustable relative to an index 57 which is stationary in the camera. Fastened to this time scale is potentiometer 30, the ends of which lead to the amplifier. Slide 29 of the potentiometer slides on the winding of the potentiometer, which likewise leads to the amplifier. Seated on the sliding contact 29 of the potentiometer is also the diaphragm scale 58 on diaphragm ring 3, which can be read relative to the stationary index 59.

It has been explained above in section 1 in connection with Fig. 2, how time ring 3 and diaphragm ring 4 are driven by a differential gear from the motor.

The function of all parts, i.e., the parts of Fig. 2 mentioned in the preceding paragraph and the parts illustrated in Fig. 9, is further explained in detail by Figs. 10 to 17.

Figure 10:
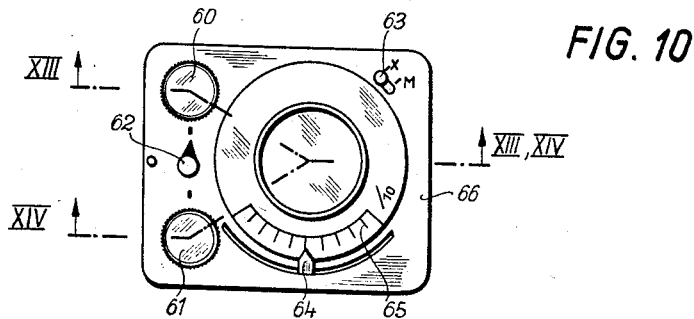

Fig. 10 illustrates in front view the structure of the shutter which is provided with the potentiometer and differential adjustment. In this figure, 60 denotes a rotary button, on which the diaphragm can be adjusted; 61 denotes another rotary button, on which the time can be adjusted; 62 denotes a so-called preselecting button which permits to provisionally hold either button 60 or button 61, whereupon the free element is adjusted by the automatic system. Thereby, it is possible to preliminarily adjust a fixed value of time or diaphragm. 63 denotes a conventional flash light synchronization; 64 is the adjustable index of the sensitivity scale 65 which is fixedly applied to the casing 66.

Figure 11:
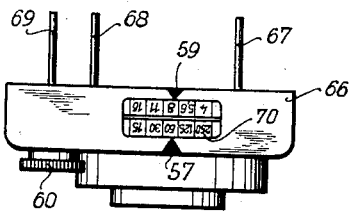

Fig. 11 is a top view of the shutter casing. In this figure 67 indicates the means for setting the shutter, 68 the shutter release, 69 the drive of the differential gear by the motor. In the window 70 the time and diaphragm scales appear opposite to indexes 57 and 59.

Figure 12:
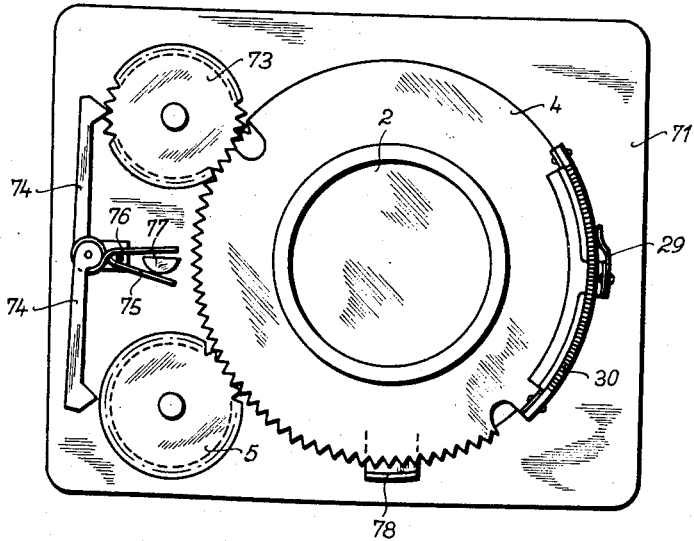

In Fig. 12 the casing is removed. In this figure, 71 denotes the objective board, on which shutter 2 is seated. 5 is the differential gear 73 a cog wheel for adjustment of the diaphragm, as will be described further below. 74 is a rocker which is shown also in Fig. 16. 75 denotes a spring which is wound about pin 76 and has a support at the half-round portion 77 of adjusting button 62 (see Fig. 10). In the position shown, the lower end is supported by the half-round side of the shaft of the adjusting button, while the other part of the spring lies against pin 76. Thereby, the rocker is brought in engagement with the upper cog wheel 73. If the adjusting button 62 (see Fig. 10) is turned by 180°, the rocker 74 will engage the lower cog wheel of the differential 5 and will lock the latter provisionally. The above description explains the preselection of time and diaphragm.

The middle position of the adjusting button 62 means a switching off of the battery so that the entire auomatic system is put out of operation. This is brought about in a simple manner (not illustrated here), whereby the amplifier button shaft 77 carries on its lower end a switch which is open in the middle position of button 62.

Figure 13:
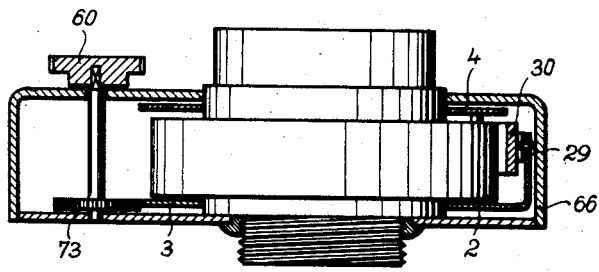

Fig. 13 is a sectional view through the shutter casing shown in Fig. 10 along line XIII—XIII. In this figure, 73 denotes the above mentioned adjusting wheel for the diaphragm, 60 denotes the adjusting button mentioned in connection with Fig. 10. Upon turing button 60, diaphragm adjusting ring 3 is taken along over cog wheel 73. This diaphragm ring 3 carries the sliding contact 29 for the potentiometer 30 which is fastened to time ring 4. The relationship between the slider 29 and the potentiometer is shown also in Fig. 12 in which (after taking off the casing) time ring 4 will first become visible on the top of the shutter, said ring carrying potentiometer 30, while only the sliding end 29 of the sliding member is visible.

Furthermore, in Fig. 12, 78 denotes the connection between one end of the diaphragm which is not controlled by the differential 72 and the cog wheel 73 and carries the index 64 (see Fig. 10).

Figure 17:
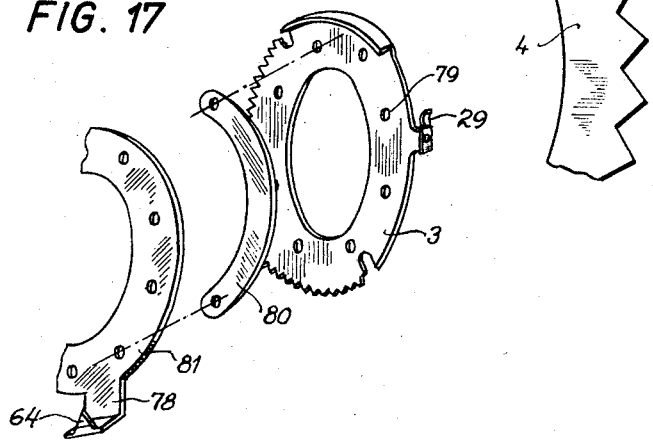

In Fig. 17 reference numeral 3 denotes the diaphragm ring which is connected with the slider 29 of the potentiometer. The lamellae 80 of the diaphragm are connected by means of a ring provided with openings 79. The other ends of the diaphragm lamellae are connected with ring 81 so that by means of the index extension 78 of this ring 81, the other end of the diaphragm can be preliminarily adjusted to a predetermined opening, whereby along scale 65 (see Fig. 10) the sensitivity of the film used can be adjusted.

Figure 14:
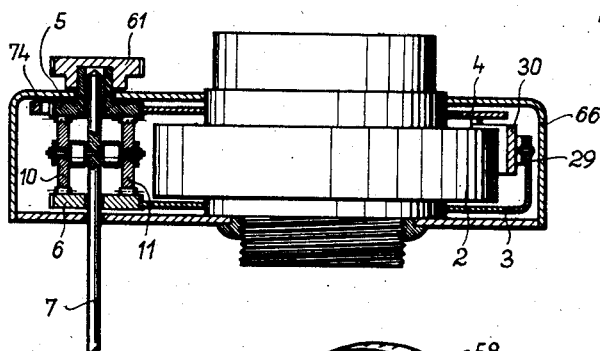
Figure 15:
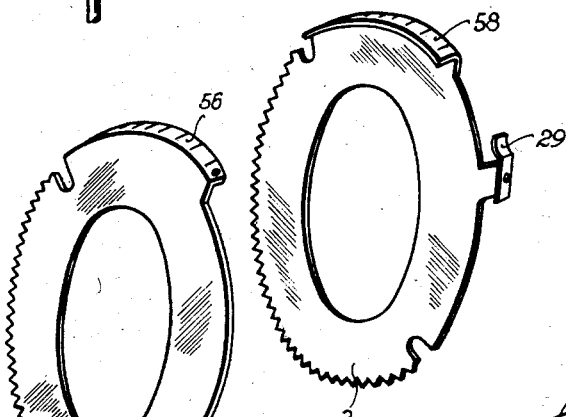

Fig. 14 is a sectional view along line XIV—XIV in Fig. 10. This figure shows below casing 66 the shutter 2 with its diaphragm ring 3 and its time ring 4. These two rings mesh with the differential wheels 5 and 6 while the planet pinions 10 and 11 (see Fig. 2) are connected with driving shaft 7. The adjusting button 61 is connected with cog wheel 5 which meshes with the time ring 4 and permits—in the manner described above in connection with the adjustment of the diaphragm—by turning the button 61 the adjustment of a predetermined time value. Ring 3 for the diaphragm and ring 4 for time, carry in the manner shown in Fig. 15 at their upper ends the scale 58 for adjustment of the diaphragm and scale 56 for the adjustment of time, said scales appearing in window 70, shown in Fig. 11.

Figure 16:
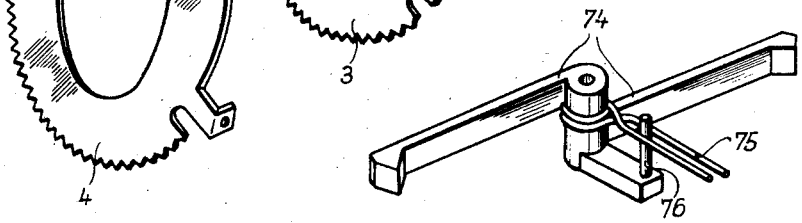

Fig. 16 illustrates the rocking lever 74 for locking cog wheels in two planes, i.e., in Fig. 14, cog wheel 5 and in Fig. 13, cog wheel 73.

The mechanical structure also includes the necessary lost motion path described in the above section 2 and illustrated in Fig. 7.

As the total mechanical construction—starting with the drive by the motor over its shaft in the differential, the time and diaphragm rings and finally the lamellae—has a certain lost motion path which is not small and is determined by the manufacture, the principle of the necessary lost motion can be utilized in order to compensate for all the occurring lost paths summarized in their effect by the inertia of the relay. According to the invention, this is effected by influencing the starting current of the relay and the current at which release of the relay occurs by changing the contact distances in such a manner that the lost motion of the gearing is compensated for by the inertia of the relay.

The advantages of the present invention can be obtained not only in connection with the specific embodiment here shown, but also in numerous modifications. The example of the miniature camera diagrammatically illustrated in the above description and the drawings could be supplemented by additional examples for applying the invention to box cameras, motion picture cameras and the like. The automatic diaphragm adjustment offers very considerable advantages, particularly for the last mentioned type of cameras because the auxiliary means hitherto used, for example, the mirrored pointer of an exposure meter and similar means, are insufficient according to experience.

It will be therefore understood that this invention is not limited to the specific elements, arrangements, steps and other details specifically described above and illustrated in the drawings and can be carried out with various modifications without departing from the scope of the invention as defined in the appended claims.

The abbreviation "MO" is used herein to denote megohms.

What is claimed is:

1. A photographic camera comprising a shutter and a diaphragm, an automatically operating device including means for adjusting exposure time, diaphragm and film sensitivity; said device being controlled by a photocell producing electric current upon the incidence of light in said cell; said device including an electric battery, a switch for switching on and off the battery current, an adjusting member for the diaphragm, an adjusting member for time, means limiting the range of movement of said adjusting members, an electric motor for the displacement of the members for adjusting exposure time and diaphragm, a potentiometer in the circuit of the battery and a relay provided with two windings; a differential gear which is provided between the diaphragm adjusting member and the time adjusting member, and over the differential shaft of which the motor drive of said members for adjustment of the exposure time, and diaphragm is carried out; a detent device comprising a selector which is adapted to be switched by an operating handle from the outside and to selectively cause elastic arresting of the member for adjusting the diaphragm and the member for adjusting the time, respectively, whereby the non-arrested of said members can be automatically adjusted over said differential gear; means for subsequent automatic adjustment of the elastically arrested member, if the non-arrested member reaches an end position of its range of movement, without attaining a correct exposure value; the potentiometer being arranged between the diaphragm-adjusting member and the time-adjusting member and one of its two members, consisting of the resistance member and the sliding contact of the potentiometer, being carried by the diaphragm adjusting member and the other of said members by the time adjusting member; one of said two windings of the relay being coordinated to the circuit which includes the photocell and the other of said windings being in a circuit which is supplied by the battery and contains a contact for switching on and off and reversing the electric motor; means for operating the total system in an electric compensating circuit and for amplifying the current of the photocell, by which the photo-cell current, as well as the current of the electric motor are automatically compensated to zero, in the automatic adjustment of the exposure factors.

2. A photographic camera as claimed in claim 1 wherein the selector has three positions and by means of which one of the two rings for adjusting the diaphragm and time can be electrically arrested, said selector lever having an additional zero position, in which the entire automatic system is disconnected from the camera.

3. A photographic camera, as claimed in claim 1, in which the diaphragm-adjusting ring, and the time-adjusting ring, are each operatively connected with separate manually operable rotary buttons for adjusting the diaphragm and time values.

4. A photographic camera, as claimed in claim 3, in which for adjustment of the film sensitivity the normally stationary end of the diaphragm is provided with an adjusting ring and an index, the latter being adjustable relative to a scale which is stationary in the camera.

5. A photographic camera as claimed in claim 1, in which the current flowing through the potentiometer simultaneously passes through a second winding of the relay, for compensating for the voltage drop of the battery over a period of time.

6. A photographic camera as claimed in claim 1, comprising a movable release button having the additional function of putting into operation the automatic adjusting system, by maintaining on a first portion of its path of movement up to a distinctly perceptible pressure point, the automatic system in switched on condition; switching off the automatic system upon passing its further path of movement and subsequently releasing the shutter.

7. A photographic camera, as claimed in claim 1, in which, upon one of the time-adjusting and diaphragm-adjusting rings reaching its terminal position by automatic adjustment, the other of said rings is likewise automatically moved, in order to change the originally preselected and arrested position, in order to secure correct exposure under the prevailing light conditions.

8. A photographic camera as claimed in claim 7, comprising means for compensating the lost motion path of the entire adjusting gear by adjusting the position of the range between the attraction and release of the relay.

9. A photographic camera as claimed in claim 1, in which said subsequent automatic adjustment of the eelectrically arrested member is brought about by the electric motor over said differential shaft of the differential gear, against the effect of the means for elastically arresting said member.

References Cited in the file of this patent

UNITED STATES PATENTS

| | | |
|---|---|---|
| 2,059,032 | Riszdorfer | Oct. 27, 1936 |
| 2,683,402 | Bruck | July 13, 1954 |
| 2,780,971 | Fahlenberg | Feb. 12, 1957 |